United States Patent
Casino et al.

(10) Patent No.: US 6,943,704 B1
(45) Date of Patent: Sep. 13, 2005

(54) METHOD FOR COLLECTING ALTITUDE-RELATED DATA ALONG ROADS

(75) Inventors: Roy Casino, Mundelein, IL (US); James Herbst, Chicago, IL (US); Michele Herbst, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 256 days.

(21) Appl. No.: 10/298,118

(22) Filed: Nov. 15, 2002

(51) Int. Cl.[7] ............................................. G08G 1/123
(52) U.S. Cl. .................. 340/995.28; 340/992; 342/63; 342/357.13; 342/462; 70/50; 70/206; 70/207; 70/213
(58) Field of Search ....................... 340/995.28, 995.19, 340/992; 701/206, 209, 213, 216, 217, 50, 701/207; 342/63, 357.13, 462

(56) References Cited

U.S. PATENT DOCUMENTS

| | | | | |
|---|---|---|---|---|
| 4,238,824 A | * | 12/1980 | DeMatte et al. | 701/207 |
| 4,445,120 A | * | 4/1984 | Rosenthal | 342/462 |
| 4,700,223 A | * | 10/1987 | Shoutaro et al. | 348/148 |
| 4,807,131 A | * | 2/1989 | Clegg | 701/50 |
| 4,829,304 A | * | 5/1989 | Baird | 342/63 |
| 5,563,608 A | | 10/1996 | Tachita et al. | |
| 5,574,649 A | * | 11/1996 | Levy | 701/207 |
| 5,721,685 A | * | 2/1998 | Holland et al. | 701/207 |
| 5,862,511 A | * | 1/1999 | Croyle et al. | 701/213 |
| 5,884,218 A | * | 3/1999 | Nimura et al. | 701/208 |
| 6,009,359 A | | 12/1999 | El-Hakim et al. | |
| 6,157,342 A | * | 12/2000 | Okude et al. | 342/357.13 |
| 6,480,784 B2 | * | 11/2002 | Mizuno | 701/207 |
| 6,484,086 B2 | | 11/2002 | Jeon | |
| 2004/0021567 A1 | * | 2/2004 | Dunn | 340/539.13 |

* cited by examiner

*Primary Examiner*—Daniel Wu
*Assistant Examiner*—Samuel J. Walk
(74) *Attorney, Agent, or Firm*—Frank J. Kozak; Jon D. Shutter; Lawrence M. Kaplan

(57) ABSTRACT

A method is disclosed for obtaining altitude-related data along roads. A vehicle includes equipment capable of determining the current absolute positions of the vehicle as it is being driven. The vehicle also includes equipment capable of determining a distance traveled by the vehicle. Two points along a road are selected. Altitude-related data are determined as a function of the horizontal difference between the absolute positions of the two points and the distance traveled by the vehicle between the two points.

21 Claims, 3 Drawing Sheets

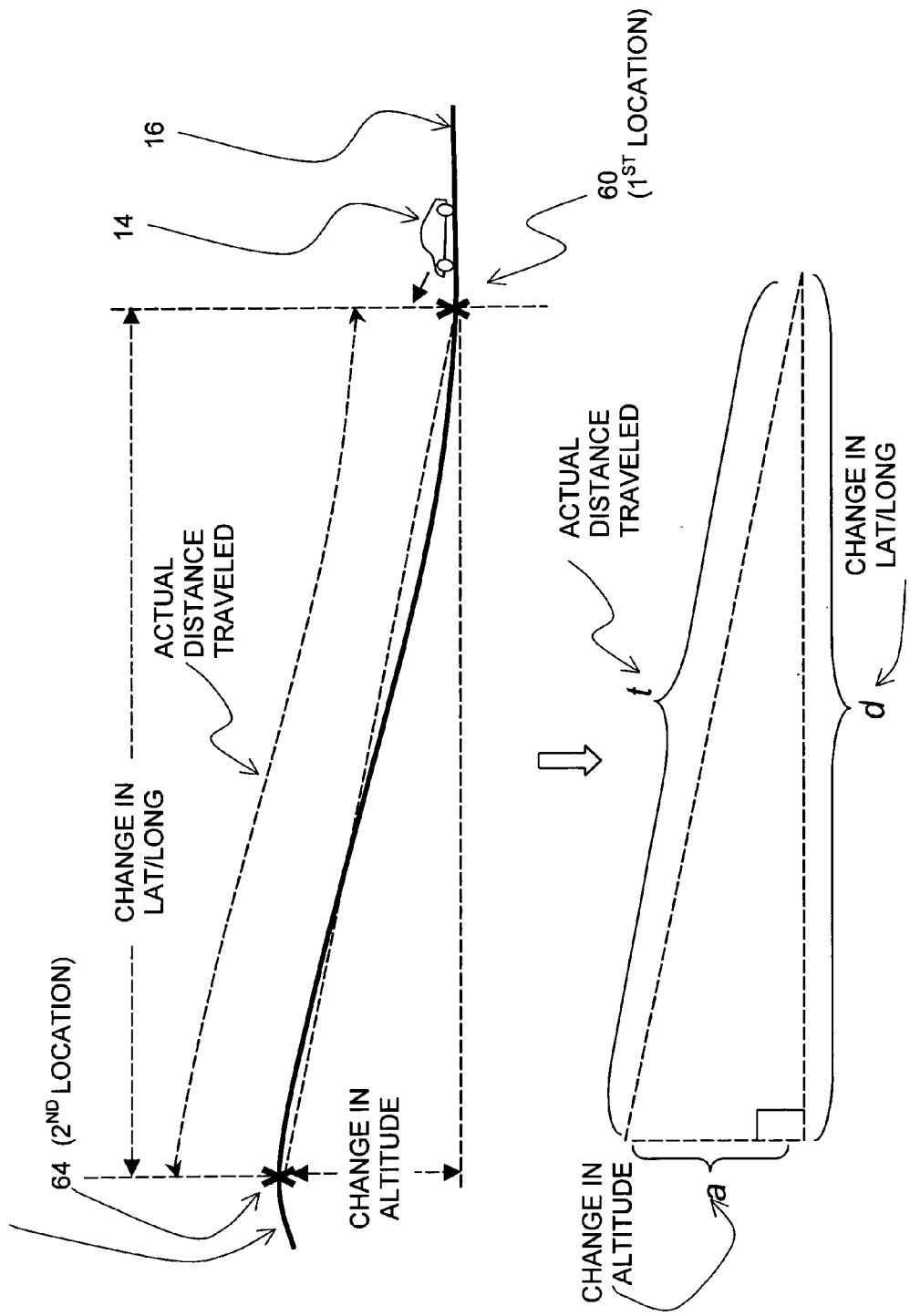

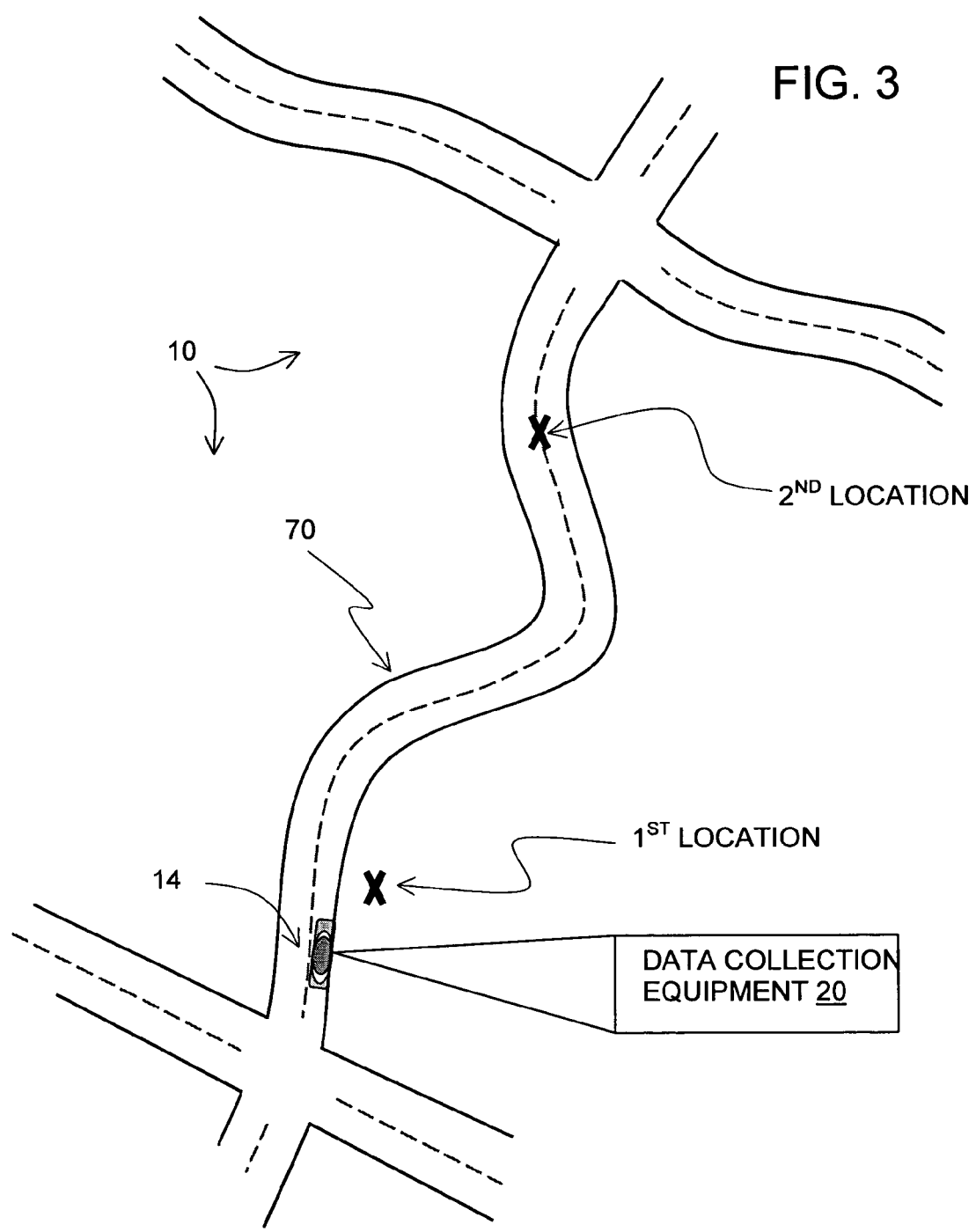

US 6,943,704 B1

METHOD FOR COLLECTING ALTITUDE-RELATED DATA ALONG ROADS

BACKGROUND OF THE INVENTION

The present invention relates to a method for obtaining altitude-related data at locations along roads, in particular while traveling along the roads in a moving vehicle. Such data can be used in vehicle navigation and safety systems.

There are various driver assistance systems for vehicles that help make travel safer and more convenient. For example, one of these driver assistance systems is an adaptive cruise control system that automatically maintains a safe distance between a vehicle and other vehicles or other objects ahead of it. Another driver assistance system is a curve warning system that provides a warning to the vehicle driver if an upcoming curve is being approached too fast and automatically decreases the vehicle speed, if necessary. Another driver assistance system adjusts operation of the vehicle transmission to match the grade of the upcoming road. There are other driver assistance systems in addition to these.

Some of these driver assistance systems use data that represent the road network in the geographic area in which the vehicle is traveling. These data include information about the roads, such as the locations (i.e., geographic coordinates) of the roads and intersections along the roads. The data may also include information about the speed limits along segments of roads, the road curvature, the number of lanes, etc. These road-related data are contained in one or more geographic databases located in the vehicle.

Collecting this kind of road-related data is a significant task. Methods for collecting road-related data are described in U.S. Pat. No. 6,366,851, the entire disclosure of which is incorporated by reference herein. According to an embodiment described in U.S. Pat. No. 6,366,851, a company that produces geographic databases employs technicians (referred to as "researchers") to physically travel throughout assigned areas in specially equipped vehicles to collect and record information about geographic features for inclusion in and updating of a master copy of a geographic database. Installed in each vehicle is a positioning apparatus, such as a DGPS unit. As the vehicle is driven by a researcher along roads in a geographic area, the positions of the vehicle are determined by the DGPS unit. Data indicating these positions are stored in a data storage device in the vehicle. These positions trace the path of the vehicle and therefore indicate the location and shape of the roads upon which the vehicle has traveled. Other types of road-related data may also be collected by the researchers while the vehicles are being driven along the roads. After the road-related data are collected, the data are analyzed and used to update a master copy of a geographic database.

One type of data that is useful to obtain for use in driver assistance systems and vehicle navigation systems is data that indicate the altitude at points along a road. Data that indicate the altitude at a point can be determined with an altimeter, inclinometer or similar device. Such devices are relatively expensive however. Another consideration with these types of devices is that the data obtained may be noisy due to bouncing in the vehicle environment, i.e., these devices may not have been intended to be used in a moving vehicle. The altitude can also be determined using surveying equipment. However, surveying equipment may require that the equipment be mounted in a stationary position and therefore is not usable in a moving vehicle.

Accordingly, there exists a need for a relatively inexpensive way to determine altitude-related data at various points along a road. Further, there is a need to determine altitude-related data along roads from a moving vehicle.

SUMMARY OF THE INVENTION

To address these and other objectives, the present invention includes a method for obtaining altitude-related data along roads. A vehicle includes equipment capable of determining the current absolute positions of the vehicle as it is being driven. The vehicle also includes equipment capable of determining a distance traveled by the vehicle. Two points along a road are selected. Altitude-related data are determined as a function of the horizontal difference between the absolute positions of the two points and the distance traveled by the vehicle between the two points.

BRIEF DESCRIPTION OF THE DRAWINGS

FIG. 2 is an elevation view of a portion of the road network depicted in FIG. 1.

FIG. 3 is an illustration of another portion of the road network located in the geographic area.

DETAILED DESCRIPTION OF THE PRESENTLY PREFERRED EMBODIMENTS

I. Collection of Altitude-Related Data

Figure 1:
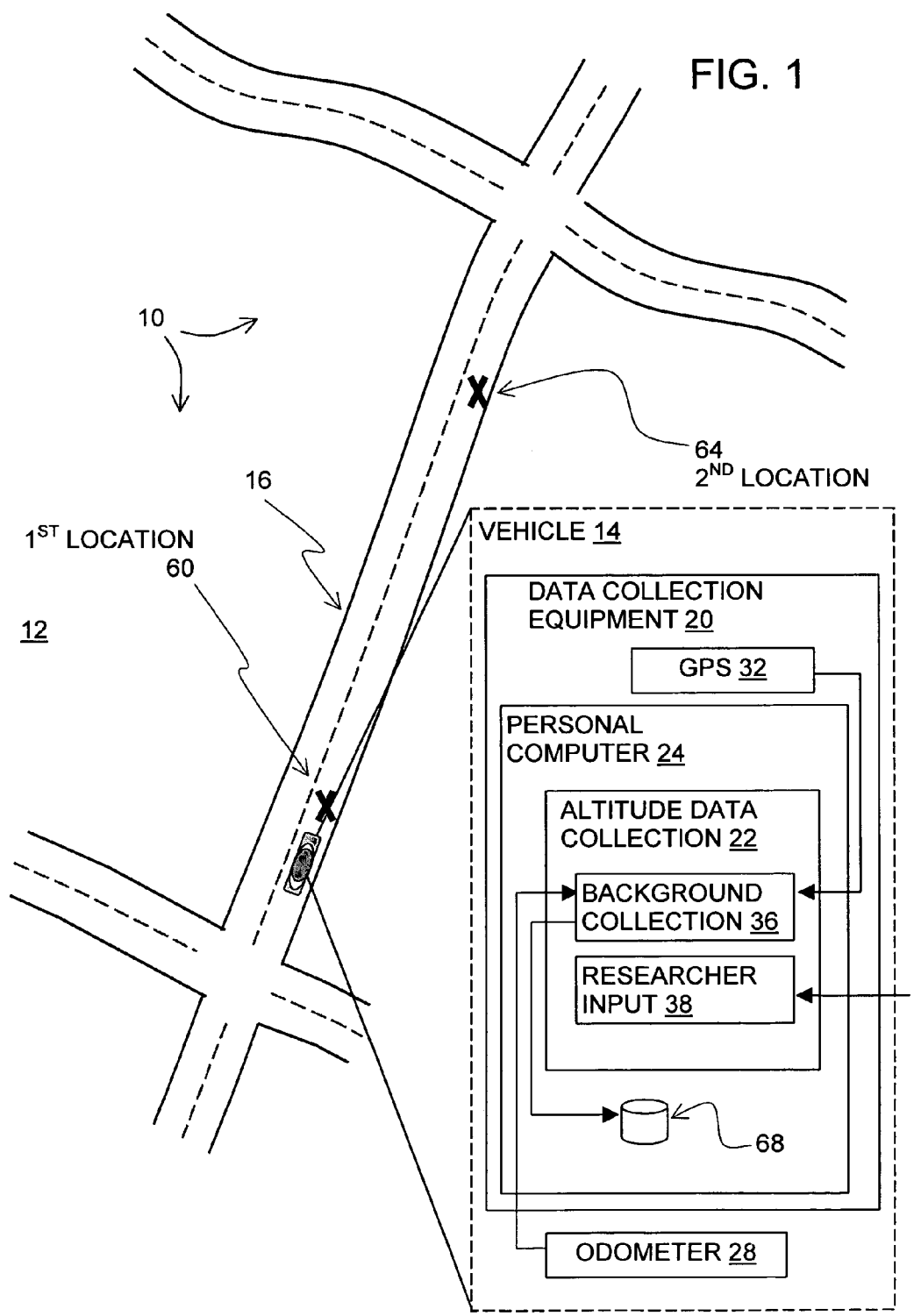
FIG. 1 is an illustration of a portion of a road network located in a geographic area.

FIG. 1 shows a portion of a road network 10. Although FIG. 1 shows only several roads in the road network 10, it should be understood that the entire road network may include hundreds or thousands of roads. The road network 10 is located in a geographic area 12, a portion of which is shown in FIG. 1. The geographic area 12 may correspond to a metropolitan region, a municipality, a state, a county, an entire country, or several countries. Alternatively, the geographic region 12 may correspond to only a portion of a metropolitan region, a municipality, a region, a state, a county, or country.

In FIG. 1, a data collection vehicle 14 is shown traveling on one of the roads 16 of the road network 10. The data collection vehicle 14 is operated by one or more technicians (referred to herein as "researchers"). The researchers are employed by a geographic database company. The researchers physically travel throughout assigned areas. The researchers collect and record information about geographic features for inclusion in and updating of a master copy of a geographic database.

Data collection equipment 20 is installed in the data collection vehicle 14. The data collection equipment 20 is operated by the one or more researchers in the vehicle 14. (Although only one vehicle with data collection equipment is shown in FIG. 1, it should be understood that the geographic database company may employ many researchers located in field offices throughout a region or country and that many similarly equipped vehicles may be used.)

The data collection equipment 20 is a combination of hardware and software components. The data collection equipment 20 includes a component that allows data to be input and stored while the vehicle is traveling along the roads 10. In one embodiment, this component is implemented with an altitude data collection program 22. The altitude data collection program 22 is a software program that is run on a suitable computer platform, such as a notebook computer 24, located and operated in the vehicle 14.

The data collection equipment 20 also includes a component that allows the absolute position of the vehicle 14 to be determined. ("Absolute position" means the position of the vehicle 14 relative to the earth. For example, the absolute position may be expressed by the geographic coordinates, i.e., latitude and longitude of the vehicle 14.) In one embodiment, the absolute position of the vehicle is determined by using a DGPS unit 32. Alternatively, other types of equipment may be used, such as a GPS unit. The DGPS unit 32 provides a data output that indicates the absolute position. The DGPS unit 32 provides this output to the notebook computer 24 via a connecting cable, an IR port, or other data transmission means.

The altitude data collection program 22 on the notebook computer 24 also receives data that indicate a distance traveled by the vehicle. The distance traveled data can be provided by an odometer 28, a wheel speed pulse sensor, or other device. If the vehicle has as standard equipment a suitably accurate odometer, wheel speed pulse sensor, or similar device, from which the distance traveled data can be obtained, the distance traveled data may be obtained from the standard equipment device. Alternatively, a separate odometer, wheel speed pulse sensor, or other device may be installed.

The altitude data collection program 22 includes a background data collection routine 36. Continuously while the altitude data collection program 22 is being run, the background data collection routine 36 receives data readings from the DGPS unit 32. The data readings from the DGPS unit 32 indicate the current position of the vehicle 14 as it travels along the roads 10. The background data collection routine 36 temporarily stores the most recent data readings from the DGPS unit 32. These data readings may be temporarily stored in the memory or hard drive of the notebook computer 24.

In this embodiment, the altitude data collection program 22 includes a researcher input routine 38. The researcher input routine 38 presents the researcher with a means to indicate the beginning and the end of a slope along the road upon which the vehicle is traveling. When the data collection equipment 20 is being used, the researcher in the vehicle 14 operates the notebook computer 24 to run the altitude data collection program 22. The researcher input routine 38 prompts the researcher to indicate a beginning of a slope. The researcher input routine 38 may present a message on the display screen of the notebook computer 24 that instructs the researcher to press a particular key on the keyboard of the notebook computer to indicate the beginning of a slope. The researcher input routine 38 continues to prompt the researcher to indicate the beginning of a slope until the particular key is pressed.

The researcher observes the road upon which the vehicle is traveling. When the researcher observes that the vehicle is at the beginning of a slope (indicated at 60 in FIGS. 1 and 2), the researcher manually presses the key indicated by the researcher input routine 38. When the key is pressed, the researcher input routine 38 associates data indicating a beginning of a slope with data indicating the closest absolute position reading from the DGPS unit 32 and data indicating the closest distance traveled reading from the odometer 28. The researcher input routine 38 temporarily stores these associated data in a memory of the notebook computer 24.

The researcher input routine 38 then stops presenting the researcher with a prompt to indicate a beginning of a slope. Instead, the researcher input routine 38 presents the researcher with a means to indicate the end of the slope along the road. The researcher input routine 38 may present a message on the display screen of the notebook computer 24 that instructs the researcher to press another key on the keyboard of the notebook computer to indicate the end of the slope. The researcher input routine 38 continues to prompt the researcher to indicate the end of the slope until the key is pressed.

When the researcher observes that the vehicle is at the end of the slope (indicated at 64 in FIGS. 1 and 2), the researcher manually presses the key indicated by the researcher input routine 38. When the key is pressed, the researcher input routine 38 associates data indicating the end of the slope with data indicating the closest absolute position reading from the DGPS unit 32 and data indicating the distance traveled reading from the odometer 28. The researcher input routine 38 stores these data on the hard drive 68 of the notebook computer 24. The researcher input routine 38 then prompts the researcher to indicate a beginning of another slope and the process continues.

After the researcher has completed the collection of data while traveling on roads in the assigned area, the data are used to update a master copy of a geographic database. This updating may be performed by the researcher or by another person.

II. Processing Of Altitude-Related Data

There are various different types of altitude-related data that can be determined or derived from the data collected by the researcher in the field. Some types of altitude-related data include the relative altitude between points, the absolute altitude of points, and the grade along portions of roads. There are other types of altitude-related data that may be determined in addition to these.

The relative altitude between associated pairs of first and second points is determined using the change in absolute position between the associated points and the distance traveled between the points. One way to determine the altitude difference is by using the Pythagorean theorem. Referring to the bottom portion of FIG. 2, the horizontal distance, d, from the absolute position of the first location 60 to the absolute position of the second location 64 and the altitude change, a, between the first location 60 and the second location 64 form the legs of a right triangle whose hypotenuse is approximated by the distance traveled, t, between the first location 60 and the second location 64. Therefore, to determine the altitude a, the distance, d, between the absolute position of the first location 60 and the absolute position of the second location 64 is determined. Then, the distance traveled, t, between the first location 60 and the second location 64 is determined. Then, the change in altitude, a, is determined according to the following formula.

$$a = \sqrt{t^2 - d^2}$$

Another type of altitude-related data is the absolute altitude of a point. The change in altitude data between associated pairs of first points and second points can be used to determine the absolute altitude of a point. In order to obtain the absolute altitude of a point from the change of altitude between associated pairs of first points and second points, it is required that the absolute altitude of one of the points be known. The absolute altitude of one of the points can be determined by any various known methods. Once the absolute altitude of one of the associated pairs of points is known, the absolute altitude of the other of the points can be determined by adding the change in altitude to the altitude of the known point. For example, if the absolute altitude at the first position is known, the absolute altitude at the second position can be determined according to the following formula.

$$\text{Altitude}_{2nd} = \text{Altitidue}_{1st} + \sqrt{t^2 - d^2}$$

Another type of altitude-related data is grade. The grade is a property (i.e., attribute) of a portion of a road between two points. The grade can be determined by the altitude divided by the distance according to the following formula.

$$\text{Grade} = \frac{\sqrt{t^2 - d^2}}{d}.$$

III. Alternatives

One of the considerations that may need to be taken into account in some circumstances is that the portion of road between the start of a slope and the end of the slope may not necessarily be straight. This situation is illustrated in FIG. 3. In FIG. 3, the portion 70 of road between the location of the start of the slope and the location of the end of the slope has curves in it. These curves increase the distance traveled between the location of the start of the slope and the location of the end of the slope. This increase in distance affects the calculation of the change of altitude using the method disclosed in connection with FIGS. 1 and 2. To account for the increase in distance traveled resulting from a curve in the road, the distance traveled should be decreased proportionately.

In one of the embodiments described above, it was stated that the change in altitude between associated pairs of points can be determined using the Pythagorean theorem. There are other methods that can be used to determine this change in altitude. For example, the change in altitude can be determined using a look-up table.

It was described above that the locations of the starting and ending points of a slope were indicated manually by a researcher. According to another embodiment, a barometer or inclinometer may be used for detecting these grade change locations. In this embodiment, the researcher would not have to manually enter the grade change points. Rather, the barometer, inclinometer, or similar device would be used to detect a grade change point and record that location in appropriate software.

According to another embodiment, the starting and ending points of a slope are determined automatically. This determination is made by a slope detection routine. The slope detection routine is a software routine that is part of the altitude data collection program or may be part of another program that processes the data collected by the researcher in the field. The slope detection routine compares the linear distance between two selected points (measured by the odometer) to the horizontal distance (i.e., absolute distance) between these same points. The slope detection routine determines that the vehicle has traversed a slope when the distance traveled by the vehicle between two selected points exceeds the horizontal distance. Data readings for corresponding intermediate points located between the two selected points may be used to confirm or recognize the existence of a slope. For example, if the distance traveled exceeds the horizontal distance by 4% for 8 consecutive corresponding data readings, each approximately 10 meters apart, these data readings indicate that the road has a consistent slope along these entire 80 meters. A determination is also made whether the detected slope is an "up" slope or a "down" slope. In one alternative, the slope detection routine prompts the researcher for input to indicate whether a detected slope is up or down. In another embodiment, a device, such as an inclinometer, may be used. The accuracy of this device does not have to be very high since it is being used only to make the determination whether the detected slope was up or down. Therefore, a relatively inexpensive device may be used. In another alternative, the determination whether a detected slope is up or down by using the altitude data obtained from the DGPS unit.

It is intended that the foregoing detailed description be regarded as illustrative rather than limiting and that it is understood that the following claims including all equivalents are intended to define the scope of the invention.

We claim:

1. A method of obtaining altitude-related data along roads, the method comprising the steps of:
   traveling along roads in a vehicle;
   determining a first absolute position of the vehicle at a first position along one of the roads;
   determining a second absolute position of the vehicle at a second position along one of the roads; and
   determining altitude-related data as a function of a horizontal difference between the first absolute position and the second absolute position and a distance traveled by the vehicle between the first position and the second position.

2. The method of claim 1 wherein the altitude-related data includes a change of altitude between the first position and the second position.

3. The method of claim 2 wherein the change of altitude between the first position and the second position is determined by:
   determining a square of the horizontal difference between the first absolute position and the second absolute position;
   determining a square of the distance traveled by the vehicle between the first position and the second position; and
   determining a square root of the square of the distance traveled by the vehicle between the first position and the second position minus the square of the horizontal difference between the first absolute position and the second absolute position.

4. The method of claim 2 wherein the change of altitude between the first position and the second position is equal to a square root of a difference between the square of the horizontal difference between the first absolute position and the second absolute position and the square of the distance traveled by the vehicle between the first position and the second position.

5. The method of claim 1 wherein the altitude-related data includes an altitude at the second position.

6. The method of claim 5 further comprising:
   determining a change of altitude between the first position and the second position; and
   determining the altitude at the second position by adding the change of altitude to a known altitude of the first position.

7. The method of claim 1 wherein the altitude-related data includes a grade between the first position and the second position.

8. The method of claim 1 further comprising:
   manually selecting the first position and the second position.

9. The method of claim 1 wherein the first position and the second position are selected automatically by comparing the horizontal difference between the first absolute position and the second absolute position to the distance traveled by the vehicle between the first position and the second position.

10. The method of claim 1 further comprising:
using a device to select the first position and the second position, wherein the device is responsive to starting and ending points of slope changes.

11. The method of claim 10 wherein the device is a barometer.

12. The method of claim 10 wherein the device is an inclinometer.

13. The method of claim 1 wherein the first absolute position and the second absolute position are determined using a DGPS unit.

14. The method of claim 1 wherein the first absolute position and the second absolute position are determined using a GPS unit.

15. The method of claim 1 wherein the distance traveled by the vehicle between the first position and the second position is determined using an odometer.

16. The method of claim 1 wherein the difference traveled by the vehicle between the first position and the second position is determined using a speed pulse sensor.

17. The method of claim 1 wherein the first absolute position corresponds to the geographic coordinates of the first position and the second absolute position corresponds to the geographic coordinates of the second position.

18. The method of claim 17 wherein the geographic coordinates include latitude and longitude.

19. The method of claim 1 wherein the first absolute position and the second absolute position are determined while the vehicle is moving along said one of the roads.

20. A method of obtaining altitude-related data along roads, the method comprising the steps of:
traveling along roads is a vehicle;
determining a first absolute position of the vehicle at a first position along one of the roads;
determining a second absolute position of the vehicle at a second position along one of the roads; and
determining altitude-related data as a function of a difference between a horizontal component of the first absolute position and a horizontal component of the second absolute position and a distance traveled by the vehicle between the first position and the second position.

21. The method of claim 20 further comprising:
determining that the first position is a start of a slope and that the second position is an end of the slope when the distance traveled by the vehicle exceeds the difference between the horizontal component of the first absolute position and the horizontal component of the second absolute position.

* * * * *